(12) United States Patent
Inokuchi

(10) Patent No.: US 12,120,142 B2
(45) Date of Patent: Oct. 15, 2024

(54) ANALYSIS APPARATUS, ANALYSIS SYSTEM, ANALYSIS METHOD, AND NON-TRANSITORY COMPUTER READABLE MEDIUM STORING PROGRAM

(71) Applicant: NEC Corporation, Tokyo (JP)

(72) Inventor: Masaki Inokuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 17/617,380

(22) PCT Filed: Jun. 11, 2019

(86) PCT No.: PCT/JP2019/023084
§ 371 (c)(1),
(2) Date: Dec. 8, 2021

(87) PCT Pub. No.: WO2020/250299
PCT Pub. Date: Dec. 17, 2020

(65) Prior Publication Data
US 2022/0182406 A1    Jun. 9, 2022

(51) Int. Cl.
*H04L 9/40*    (2022.01)

(52) U.S. Cl.
CPC ...... *H04L 63/1433* (2013.01); *H04L 63/1408* (2013.01); *H04L 63/1441* (2013.01)

(58) Field of Classification Search
CPC ............. H04L 63/1433; H04L 63/1408; H04L 63/1441; G06F 21/57
See application file for complete search history.

(56) References Cited

U.S. PATENT DOCUMENTS 9,573,884 B2 *   2/2017   Allen ..................... C07C 303/18
10,659,488 B1 *  5/2020   Rajasooriya ........ H04L 63/1433
(Continued)

FOREIGN PATENT DOCUMENTS

JP    2006-235692 A    9/2006
JP    2017-224053 A    12/2017
(Continued)

OTHER PUBLICATIONS

Alhomidi et al.; "Risk Assessment and Analysis Through Population Based Attack Graph Modelling" 2013, IEEE, pp. 19-24. (Year: 2013).*

(Continued)

*Primary Examiner* — Matthew Smithers

(57) ABSTRACT

An analysis apparatus includes an analysis target selection unit configured to select entities to be analyzed, an attack graph generation unit configured to generate an attack graph for a set of the selected entities, and a countermeasure implementation assumption unit configured to assume that a countermeasure for invalidating an attack condition is implemented in the generated attack graph. The attack graph generation unit generates the attack graph on a precondition that the countermeasure for invalidating the attack condition assumed by the countermeasure implementation assumption unit has been implemented. The analysis target selection unit selects at least one of all the entities to be analyzed and adds the selected entity in the analysis targets in each of the plurality of cycles.

11 Claims, 14 Drawing Sheets

(56) References Cited

U.S. PATENT DOCUMENTS

| | | | |
|---|---|---|---|
| 10,754,959 B1* | 8/2020 | Rajasooriya | G06N 7/01 |
| 10,848,515 B1* | 11/2020 | Pokhrel | H04L 63/1433 |
| 11,281,806 B2* | 3/2022 | Hadar | H04L 41/22 |
| 11,283,825 B2* | 3/2022 | Grabois | H04L 63/20 |
| 2006/0075503 A1 | 4/2006 | Bunker et al. | |
| 2009/0077666 A1* | 3/2009 | Chen | G06Q 10/0631 |
| | | | 726/25 |
| 2010/0275263 A1* | 10/2010 | Bennett | G06F 21/577 |
| | | | 345/589 |
| 2014/0082733 A1* | 3/2014 | Benefield | H04L 63/1441 |
| | | | 726/25 |
| 2014/0173740 A1* | 6/2014 | Albanese | G06F 21/577 |
| | | | 726/25 |
| 2015/0244734 A1* | 8/2015 | Olson | G06F 21/577 |
| | | | 726/25 |
| 2016/0205122 A1* | 7/2016 | Bassett | H04L 63/1441 |
| | | | 726/23 |
| 2017/0046519 A1* | 2/2017 | Cam | G06N 7/01 |
| 2017/0063910 A1* | 3/2017 | Muddu | G06F 3/0482 |
| 2017/0286690 A1* | 10/2017 | Chari | G06F 21/577 |
| 2018/0330103 A1* | 11/2018 | Chari | H04L 63/1433 |
| 2019/0258953 A1* | 8/2019 | Lang | G06N 3/08 |
| 2020/0410109 A1* | 12/2020 | Yamada | G06F 21/577 |
| 2021/0117536 A1* | 4/2021 | Takeuchi | G06F 21/552 |

FOREIGN PATENT DOCUMENTS

| | | | |
|---|---|---|---|
| JP | 2018-077597 A | | 5/2018 |
| JP | 2020149390 A | * | 9/2020 |

OTHER PUBLICATIONS

Alhomidi et al.; "Attack Graphs Representations", 2012, IEEE, pp. 83-88. (Year: 2012).*

Safaa et al.; "Modeling Network Attacks for Scenario Construction", 2008, International Joint Conference on Neural Networks, pp. 1495-1502. (Year: 2008).*

Dawkins et al.; "A Systematic Approach to Multi-Stage Network Attack Analysis", 2004, Proceedings of the Second IEEE International Information Assurance Workshop, pp. 1-9. (Year: 2004).*

International Search Report for PCT Application No. PCT/JP2019/023084, mailed on Sep. 10, 2019.

Yamada Yoshiyuki et al., "Security assessment for industrial control systems considering air gap", Proceedings of 2018 Symposium on Cryptography and Information Security (SCIS2018), Jan. 23, 2018, pp. 1-10.

* cited by examiner

ANALYSIS APPARATUS, ANALYSIS SYSTEM, ANALYSIS METHOD, AND NON-TRANSITORY COMPUTER READABLE MEDIUM STORING PROGRAM

This application is a National Stage Entry of PCT/JP2019/023084 filed on Jun. 11, 2019, the contents of all of which are incorporated herein by reference, in their entirety.

TECHNICAL FIELD

The present disclosure relates to an analysis apparatus, an analysis system, an analysis method, and a non-transitory computer readable medium storing a program.

BACKGROUND ART

In recent years, attacks on information processing systems have become a social problem, so that security measures for information processing systems have been becoming increasingly important. Therefore, various technologies for security measures have been proposed. For example, Patent Literature 1 discloses a security measure planning support system that derives attack paths against a system to be secured and plans security measures.

CITATION LIST

Patent Literature

Patent Literature 1: Japanese Unexamined Patent Application Publication No. 2018-077597

SUMMARY OF INVENTION

Technical Problem

In general, performing a process for deriving attack paths is useful for the analysis of the security of an information processing system. However, when the system to be analyzed is a large-scale system, or when a large number of computers constituting the system are densely connected to one another, the number of attack paths increases enormously, making it very difficult to perform an analysis.

The present disclosure has been made to solve such problems, and an object thereof is to analyze the security of an information processing system to be analyzed irrespective of the scale of the system or the state of connections among the computers constituting the system.

Solution to Problem

An analysis apparatus according to a first aspect of the present disclosure includes:
an analysis target selection unit configured to select entities to be analyzed from among entities which are elements of an information processing system;
an attack graph generation unit configured to generate an attack graph for a set of the selected entities; and
a countermeasure implementation assumption unit configured to assume that a countermeasure for invalidating an attack condition is implemented in the generated attack graph, in which
a series of processes including a process of the analysis target selection unit, a process of the attack graph generation unit, and a process of the countermeasure implementation assumption unit is repeated over a plurality of cycles until all entities to be analyzed are selected as analysis targets,
the attack graph generation unit generates the attack graph on a precondition that the countermeasure for invalidating the attack condition assumed by the countermeasure implementation assumption unit has been implemented, and
the analysis target selection unit selects at least one of all the entities to be analyzed and adds the selected entity in the analysis targets in each of the plurality of cycles.

An analysis system according to a second aspect of the present disclosure includes a plurality of analysis apparatuses, in which
each of the analysis apparatuses includes:
an analysis target selection unit configured to select entities to be analyzed from among entities which are elements of an information processing system;
an attack graph generation unit configured to generate an attack graph for a set of the selected entities; and
a countermeasure implementation assumption unit configured to assume that a countermeasure for invalidating an attack condition is implemented in the generated attack graph,
in each of the analysis apparatuses, a series of processes including a process of the analysis target selection unit, a process of the attack graph generation unit, and a process of the countermeasure implementation assumption unit is repeated over a plurality of cycles until all entities to be analyzed are selected as analysis targets,
the attack graph generation unit generates the attack graph on a precondition that the countermeasure for invalidating the attack condition assumed by the countermeasure implementation assumption unit has been implemented,
the analysis target selection unit selects at least one of all the entities to be analyzed and adds the selected entity in the analysis targets in each of the plurality of cycles,
the analysis target selection unit of each of the analysis apparatuses selects entities from subsets different from each other, the subsets belonging to a set composed of all the entities to be analyzed, and
one of the analysis apparatuses summarizes processing results of the countermeasure implementation assumption units of all the analysis apparatuses, and generates an attack graph for the set of all the entities to be analyzed based on the processing results.

An analysis method according to a third aspect of the present disclosure includes:
performing a process for selecting entities to be analyzed among entities which are elements of an information processing system;
performing a process for generating an attack graph for a set of the selected entities; and
performing a process for assuming implementation of a countermeasure for invalidating an attack condition in the generated attack graph, in which
a series of processes including the process for selecting entities to be analyzed, the process for generating an attack graph, and the process for assuming implementation of a countermeasure is repeated over a plurality of cycles until all entities to be analyzed are selected as analysis targets,
in the process for generating an attack graph, the attack graph is generated on a precondition that the countermeasure for invalidating the attack condition assumed in the process for assuming implementation of a countermeasure has been implemented, and in the process for selecting entities to be analyzed, at least one of all the entities to be analyzed is selected and added in the analysis targets in each of the plurality of cycles.

A program according to a fourth aspect of the present disclosure causes a computer to perform:
an analysis target selection step of selecting entities to be analyzed among entities which are elements of an information processing system;
an attack graph generation step of generating an attack graph for a set of the selected entities; and
a countermeasure implementation assumption step of assuming implementation of a countermeasure for invalidating an attack condition in the generated attack graph, in which
a series of processes including a process of the analysis target selection step, a process of the attack graph generation step, and a process of the countermeasure implementation assumption step is repeated over a plurality of cycles until all entities to be analyzed are selected as analysis targets,
in the attack graph generation step, the attack graph is generated on a precondition that the countermeasure for invalidating the attack condition assumed in the countermeasure implementation assumption step has been implemented, and
in the analysis target selection step, at least one of all the entities to be analyzed is selected and added in the analysis targets in each of the plurality of cycles.

Advantageous Effects of Invention

According to the present disclosure, it is possible to provide an analysis apparatus, an analysis system, an analysis method, and a program capable of analyzing the security of an information processing system to be analyzed irrespective of the scale of the system or the state of connections among the computers constituting the system.

DESCRIPTION OF EMBODIMENTS

Figure 1:
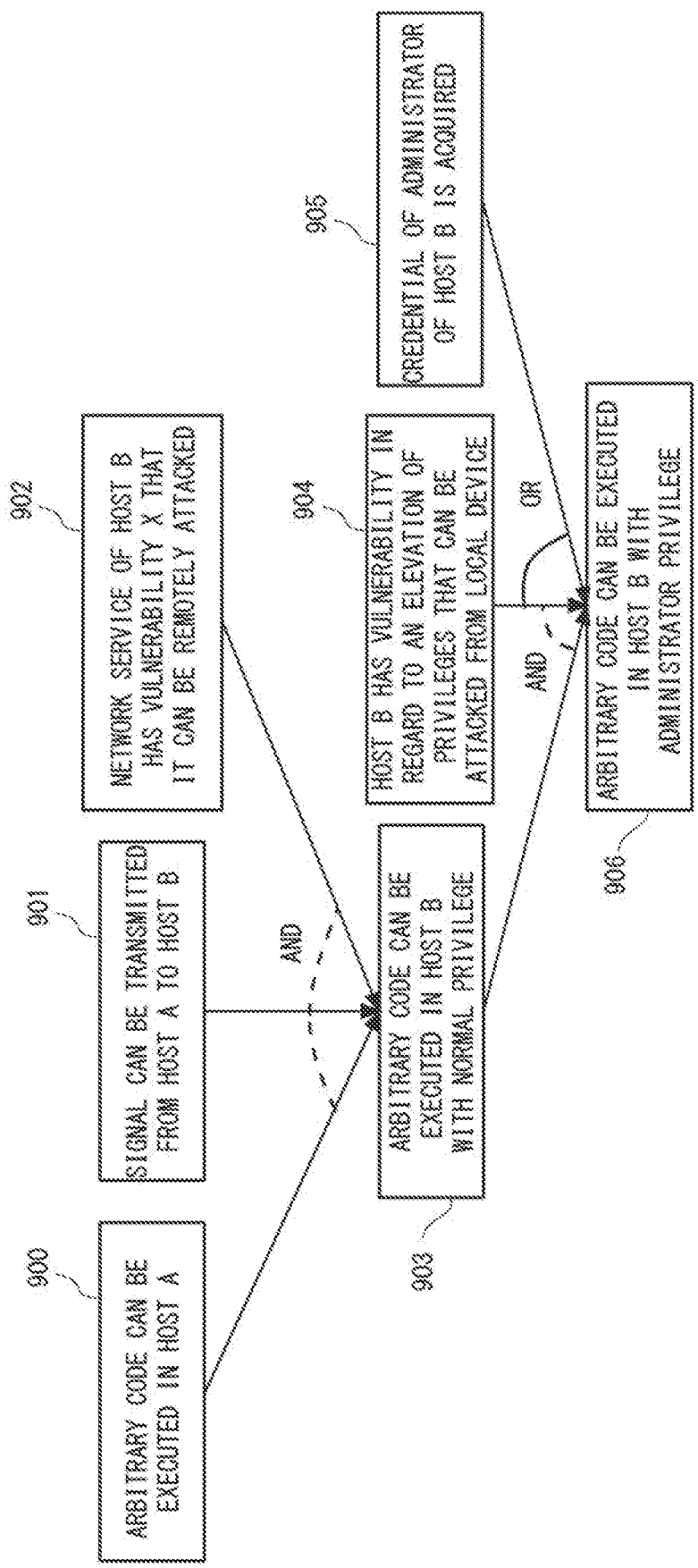
FIG. 1 is a schematic diagram showing an example of an attack graph.

For clarifying the explanation, the following descriptions and the drawings are partially omitted and simplified as appropriate. Note that the same reference numerals (or symbols) are assigned to the same elements throughout the drawings, and redundant explanations thereof are omitted as appropriate.

Firstly, an attack graph will be described. An attack graph is a graph that represents an attack procedure taken by an attacker against an information processing system to be analyzed. Typically, an attack graph is a graph in which each of conditions necessary for an attacker to carry out an attack and results that are obtained when the attack is carried out is represented by a node. In the following description, nodes representing conditions necessary for an attacker to carry out an attack are referred to as attack condition nodes, and nodes representing results that are obtained when the attack is carried out are referred to as attack result nodes. In an attack graph, an attack result node of a given attack serves as an attack condition node for another attack, so that it can express an attack composed of a plurality of steps. Note that, in the attack graph, a plurality of attack condition nodes can be connected to an attack result node. In this case, a logical operation such as a logical conjunction or a logical disjunction may be assigned among such a plurality of attack condition nodes.

FIG. 1 is a schematic diagram showing an example of an attack graph. FIG. 1 shows an attack graph for an attack on a host B that is started from a host A. Note that the hosts A and B are both host computers that constitute (i.e., are included in) an information processing system to be analyzed. In the attack graph shown in FIG. 1, nodes 900, 901 and 902 are attack condition nodes connected to a node 903. A logical conjunction (AND) is assigned to the nodes 900, 901 and 902, indicating that an attack that will result in a result represented by the node 903 can be carried out when all the conditions represented by these three nodes hold. The node 903 is an attack result node and is also an attack condition node connected to a node 906. Further, nodes 904 and 905 are attack condition nodes connected to the node 906. The node 906 is an attack result node. A logical disjunction (OR) is assigned between the nodes 904 and 905, and a logical conjunction (AND) is assigned among a set of nodes composed of the nodes 904 and 905 and the node 903. Therefore, it is shown that when the conditions represented by the nodes 903 and 904 both hold, or when the conditions represented by the nodes 903 and 905 both hold, an attack that will result in a result represented by the node 906 can be carried out.

Although the content (e.g., a condition or a result) represented by each of the nodes in the attack graph shown in FIG. 1 is merely an example, each of the nodes in the attack graph shown in FIG. 1 will be described in detail in order to facilitate the understanding thereof. The node 900 indicates a condition that an attacker can execute an arbitrary program code in the host A. The node 901 indicates a condition that the host A can transmit a signal to the host B. The node 902 indicates a condition that a network service of the host B has a vulnerability X that it can be remotely attacked. The node 903 indicates a result or a condition that an arbitrary code can be executed in the host B with a normal privilege (i.e., a normal-user privilege). Therefore, the attack graph shows that when the conditions of the nodes 900, 901 and 902 all hold, it causes a result that an arbitrary code can be executed in the host B with the normal privilege.

Further, the node 904 indicates a condition that the host B has a vulnerability in regard to an elevation of privilege that can be attacked from a local device. The node 905 indicates a condition that the credentials of an administrator of the host B have been acquired. The node 906 indicates a result that it is possible to execute an arbitrary program code in the host B with an administrator privilege. Therefore, the attack graph shows that when the conditions of the nodes 903 and 904 both hold, or when the conditions of the nodes 903 and 905 both hold, it causes a result that an arbitrary code can be executed in the host B with the administrative privilege.

As described above, the attack graph shown in FIG. 1 represents an attack path of an attack on the host B (the attack represented by the node 906) that is started from the host A.

Figure 2:
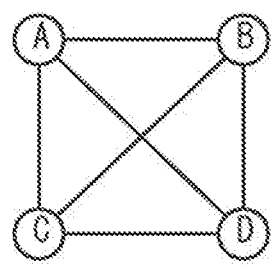
FIG. 2 is a schematic diagram showing connections of hosts in an information processing system.

Since the attack path is specified in the attack graph as described above, it is useful for analyzing the security of the information processing system to be analyzed. However, when an information processing system to be analyzed is a large-scale system, or when a large number of computers constituting the system are densely connected to one another, the number of nodes in the attack graph increases enormously and the number of attack paths also increases enormously. Therefore, in general, it is very difficult to perform the analysis. As an example, attack paths of an attack on a host D started from a host A in an information processing system in which four host computers (hosts A, B, C and D) are connected to each other as shown in FIG. 2 will be examined. In this case, in addition to a direct attack path from the host A to the host D, there may be, for example, the following detoured (i.e., alternative) paths.

- An attack path from the host A to the host D through the host B
- An attack path from the host A to the host D through the host C.
- An attack path from the host A to the host D through the hosts B and C in this order.
- An attack path from the host A to the host D through the hosts C and B in this order.

When security measures are taken, it is necessary to take account of the detoured attack paths as well as the direct attack path. Therefore, in the above-described example, there are at least five different attack paths against which security measures need to be taken. Note that, in the above-described detoured attack paths, for the sake of explanation, only simple detoured paths are listed. However, in reality, there are, for example, attack paths in which given hosts can be used as stepping stones a plurality of times, so that the number of attack paths may increase even further.

As described above, depending on the configuration of an information processing system to be analyzed, the number of attack paths could increase enormously and the analysis thereof could become very difficult. Therefore, in the present disclosure, a technology that makes it possible to analyze the security of an information processing system to be analyzed irrespective of the scale of the system or the state of connections among the computers constituting the system will be described.

First Example Embodiment

Figure 3:
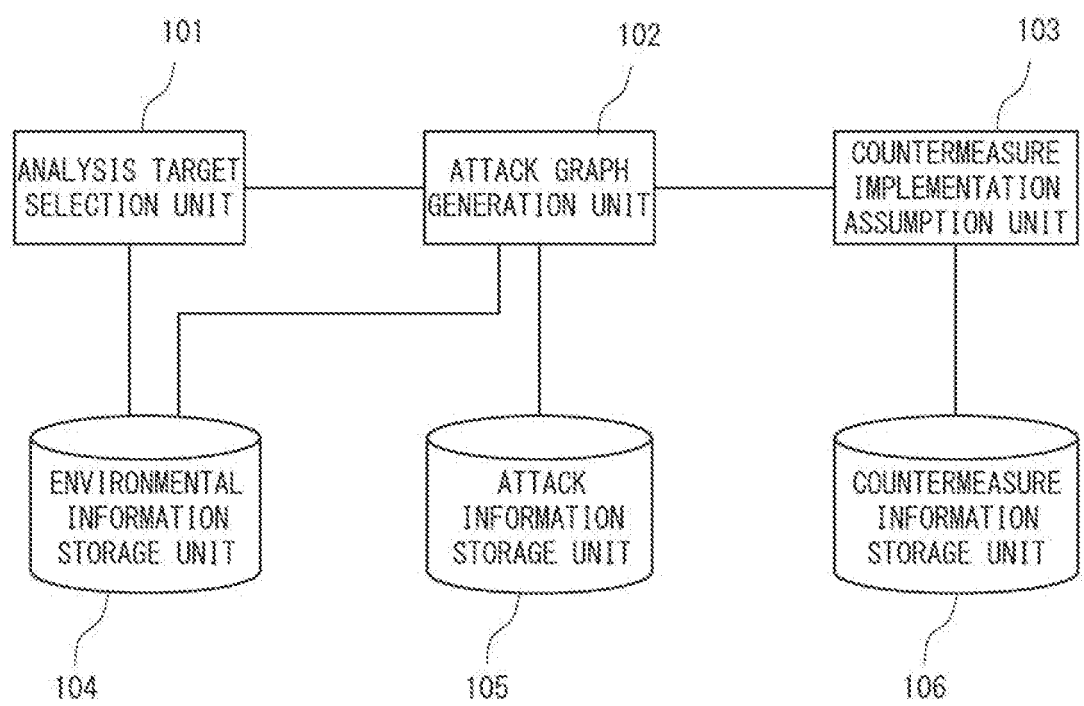
FIG. 3 is a schematic diagram showing an example of a configuration of an analysis apparatus according to a first example embodiment.

FIG. 3 is a schematic diagram showing an example of a configuration of an analysis apparatus 10 according to a first example embodiment. As shown in FIG. 3, the analysis apparatus 10 includes an analysis target selection unit 101, an attack graph generation unit 102, a countermeasure implementation assumption unit 103, an environmental information storage unit 104, an attack information storage unit 105, and a countermeasure information storage unit 106. The analysis apparatus 10 is a computer that performs an analysis for an information processing system to be analyzed. Note that the information processing system to be analyzed is, for example, a system in which a plurality of computers are connected through a network so that they can communicate with each other. For example, the information processing system to be analyzed may be an industrial control system such as a PLC (Programmable Logic Controller) or SCADA (Supervisory Control and Data Acquisition). Further, the information processing system to be analyzed may also include a corporate network (e.g., a network to which personal computers used by employees and the like are connected). As described above, the information processing system to be analyzed includes any system in which a plurality of computers are connected through a network so that they can communicate with each other.

Figure 4:
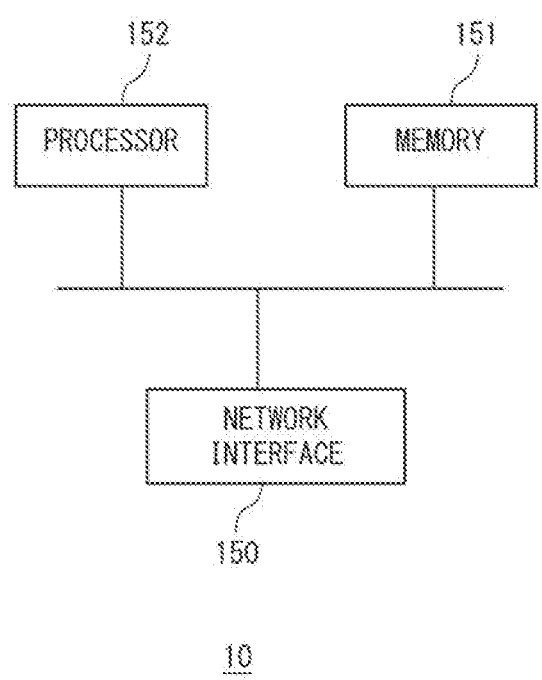
FIG. 4 is a schematic diagram showing an example of a hardware configuration of an analysis apparatus.

FIG. 4 is a schematic diagram showing an example of a hardware configuration of the analysis apparatus 10. As shown in FIG. 4, the analysis apparatus 10 includes a network interface 150, a memory 151, and a processor 152.

The network interface 150 is used to communicate with other arbitrary apparatus. The memory 151 is formed by, for example, a combination of a volatile memory and a non-volatile memory. The memory 151 is used to store software (a computer program(s)) including at least one instruction that is executed by the processor 152, and data used for various types of processing performed by the analysis apparatus 10. The environmental information storage unit 104, the attack information storage unit 105, and the countermeasure information storage unit 106 shown in FIG. 3 are implemented, for example, by the memory 151, but they may be implemented by other storage devices.

The processor 152 performs the processing of the analysis target selection unit 101, the attack graph generation unit 102, and countermeasure implementation assumption unit 103 shown in FIG. 3 by loading software (a computer program(s)) from the memory 151 and executes the loaded software. The processor 152 may be, for example, a microprocessor, an MPU (Micro Processor Unit), or a CPU (Central Processing Unit). The processor 152 may include a plurality of processors.

As described above, the analysis apparatus 10 has functions as a computer.

Further, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Each of components/structures shown in FIG. 3 will be described hereinafter in detail.

In the analysis apparatus 10, a series of processes including the process of the analysis target selection unit 101, the process of the attack graph generation unit 102, and the process of the countermeasure implementation assumption unit 103 is repeated over a plurality of cycles.

The environmental information storage unit 104 stores environmental information, which is information representing the system configuration of the information processing system to be analyzed. Specifically, the environmental information storage unit 104 includes, for example, a network configuration of the information processing system, a list of computers (e.g., host computers) constituting the information processing system, and a list of software programs installed in the computers. Note that they are merely examples of the environmental information, and the environmental information storage unit 104 may store arbitrary information about specifications related to the information processing system that are required for analyzing the security of the information processing system.

The analysis target selection unit 101 selects a computer to be analyzed among a group of computers constituting the information processing system. In the first cycle of the aforementioned plurality of cycles, the analysis target selection unit 101 selects some of all the computers to be analyzed (all the computers constituting the information processing system). Further, in the subsequent cycles, the analysis target selection unit 101 gradually adds the remaining computers in the analysis targets until all the computers to be analyzed (all the computers constituting the information processing system) are selected as analysis targets.

In the first cycle, the analysis target selection unit 101 selects at least a computer that becomes the starting point of an attack and a computer that becomes the final target of the attack. The computer that becomes the starting point of the attack and the computer that becomes the final target of the attack are selected, for example, according to designation by a user. The computer that becomes the starting point of the attack is, for example, a computer connected to a network different from the network of the information processing system (e.g., a computer connected to the Internet). Further, the computer that becomes the final target of the attack is, for example, an important computer in the information processing system. Note that, in the first cycle, the analysis target selection unit 101 may select any other computer in addition to the computer that becomes the starting point of the attack and the computer that becomes the final target of the attack. This selection may be made according to the designation of a computer by the user, or may be a random selection from the computers included in the information processing system.

In the second and subsequent cycles, the analysis target selection unit 101 newly selects a predetermined number of computers and adds them as computers to be analyzed. Note that the analysis target selection unit 101 may randomly select a predetermined number of computers from among the computers that have not yet included in the analysis targets, or may select computers according to an instruction from the user.

Note that, in the selecting process, the analysis target selection unit 101 acquire candidate computers to be selected by referring to environmental information stored in the environmental information storage unit 104.

The attack information storage unit 105 stores knowledge about attacks (hereinafter referred to as "attack information") necessary for generating an attack graph. For example, the attack information includes, but is not limited to, information about vulnerabilities in hardware or software, and may include any information necessary for generating an attack graph, such as information about attack techniques.

The attack graph generation unit 102 generates an attack graph for a set of computers selected by the analysis target selection unit 101. The attack graph generation unit 102 generates the attack graph by referring to environmental information stored in the environmental information storage unit 104 and attack information stored in the attack information storage unit 105. Note that arbitrary known tools (software) can be used for the process for generating an attack graph.

The countermeasure information storage unit 106 stores countermeasure information for eliminating attack paths present in the information processing system. An attack path is eliminated by taking a countermeasure(s) so that an attack condition node(s) does not hold. That is, an attack path associated with an attack condition is eliminated by invalidating the attack condition. For example, the countermeasure information storage unit 106 stores countermeasure information for each attack condition. Note that when there are a plurality of countermeasures for invalidating a given attack condition, i.e., when the attack condition can be invalidated by any of the plurality of countermeasures, the countermeasure information storage unit 106 may store the plurality of countermeasure information for that attack condition.

The countermeasure implementation assumption unit 103 assumes that a countermeasure for invalidating an attack condition is implemented in the attack graph generated by the attack graph generation unit 102. The countermeasure implementation assumption unit 103 does not need to actually take the countermeasure for the information processing system to be analyzed. That is, it is sufficient if the countermeasure implementation assumption unit 103 assumes that the countermeasure has been implemented. The countermeasure implementation assumption unit 103 checks whether or not there is a countermeasure that invalidates the attack condition for the attack path of interest by referring to the countermeasure information stored in the countermeasure information storage unit 106. When there are a plurality of attack conditions by which the attack path of interest can be eliminated, i.e., when a plurality of attack condition nodes are connected to the attack result node through a logical conjunction, the attack path can be eliminated when a countermeasure is taken for any one of these attack conditions. Therefore, in this case, the countermeasure implementation assumption unit 103 determines for which of attack conditions (which of the attack condition nodes) the implementation of the countermeasure is assumed. Note that, for example, the countermeasure implementation assumption unit 103 may randomly select an attack condition from among these attack conditions, or it may select an attack condition according to a predetermined selecting rule. When there are a plurality of countermeasures for the attack condition, the countermeasure implementation assumption unit 103 may specify which of the countermeasures is assumed to be implemented. For example, the countermeasure implementation assumption unit 103 may randomly select a countermeasure from among these countermeasures. The countermeasure implementation assumption unit 103 may select a countermeasure according to a predetermined selecting rule.

The countermeasure implementation assumption unit 103 may assume the implementation of a countermeasure(s) that invalidates the attack conditions for all the attack paths shown in the attack graph, or may assume the implementation of a countermeasure(s) that invalidates the attack conditions for some of a plurality of attack paths shown in the attack graph. By coping with only some of the attack paths as the attack paths to be processed by the countermeasure implementation assumption unit 103, it is possible to expect that the attack graph will become smaller while reducing the load for the above-described process.

When only some of the attack paths are eliminated, the countermeasure implementation assumption unit 103 may determine some of the plurality of attack paths shown in the attack graph based on the level of danger of the attack path determined by a predetermined index. In this way, it is possible to assume that the more dangerous the attack path is, the more preferentially it is eliminated. Note that a predetermined arbitrary index may be used as the predetermined index. For example, a score in a CVSS (Common Vulnerability Scoring System) may be used as the predetermined index. In this case, for example, the countermeasure implementation assumption unit 103 copes with, among the attack conditions shown in the attack graph, those of which the CVSS scores satisfy a predetermined condition(s) as the conditions against which the implementation of countermeasures is assumed.

When the implementation of a countermeasure for invalidating an attack condition is assumed by the countermeasure implementation assumption unit 103 in a given cycle, the attack graph generation unit 102 generates an attack graph on the precondition that the countermeasure has been implemented in the next and subsequent cycles.

Figure 5:
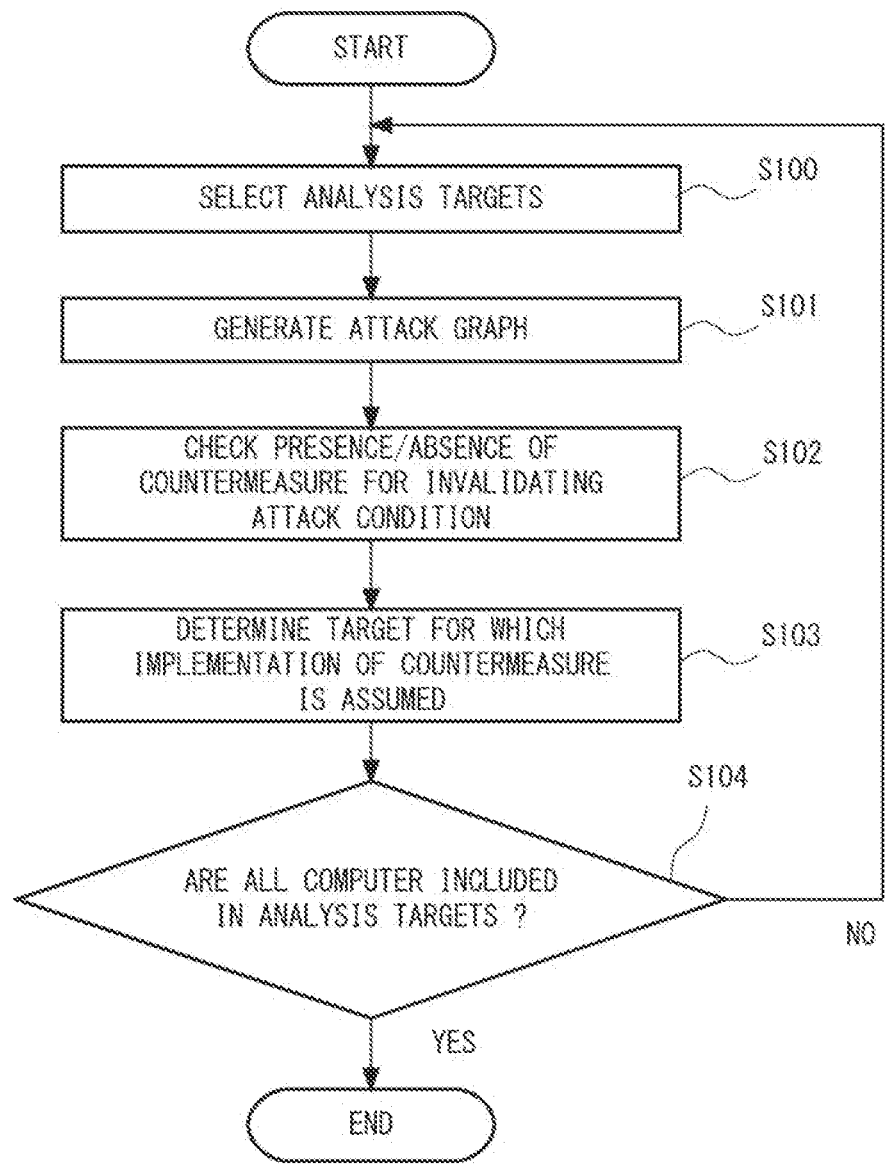
FIG. 5 is a flowchart showing an example of operations performed by the analysis apparatus according to the first example embodiment.

Next, a flow of operations performed by the analysis apparatus 10 will be described. FIG. 5 is a flowchart showing an example of operations performed by the analysis apparatus 10 according to the first example embodiment. The flow of operations performed by the analysis apparatus 10 will be described hereinafter along the flowchart shown in FIG. 5. As shown in FIG. 5, the analysis apparatus 10 regards a series of processes from a step S100 to a step S103 as one cycle, and repeats this series of processes until an end condition (i.e., a step S104) is satisfied.

In a step S100, the analysis target selection unit 101 selects analysis targets. As described above, in the first cycle, the analysis target selection unit 101 selects at least a computer that becomes the starting point of an attack and a computer that becomes the final target of the attack. Further, in the second and subsequent cycles, the analysis target selection unit 101 newly selects a predetermined number of computers that have not yet included in the analysis targets.

In the step S101, the attack graph generation unit 102 generates an attack graph for a set composed of all the targets selected by the analysis target selection unit 101 throughout all the preceding cycles. However, when the implementation of a countermeasure(s) for invalidating an attack condition(s) is assumed by the countermeasure implementation assumption unit 103 in the preceding cycles, the attack graph generation unit 102 generates an attack graph on the precondition that the countermeasure(s) has been implemented. Therefore, an attack graph in which the attack path(s) related to the countermeasure(s) is eliminated is generated.

In the step S102, the countermeasure implementation assumption unit 103 checks whether or not there is a countermeasure(s) for invalidating an attack condition(s) for an attack path(s) present in the attack graph generated in the step S101 by referring to the countermeasure information stored in the countermeasure information storage unit 106.

Next, in the step S103, the countermeasure implementation assumption unit 103 determines which of the attack conditions for which there are countermeasures for invalidation should be coped with (i.e., selected) as the target (i.e., the attack condition) for which the implementation of the countermeasure will be assumed. Then, the countermeasure implementation assumption unit 103 assumes that the countermeasure has been implemented for the determined target (i.e., the determined attack condition).

Next, in the step S104, the analysis target selection unit 101 determines whether or not all the computers in the information processing system are included in the analysis targets. When not all the computers of the information processing system are included in the analysis targets, the process returns to the step S100 and the processes in the next cycle are performed. On the other hand, when all the computers in the information processing system are included in the analysis targets, the process is finished. Note that when the process is finished, the attack graph generation unit 102 and the countermeasure implementation assumption unit 103 may output the processing results in each cycle. In particular, the countermeasure implementation assumption unit 103 may output information as to for which attack condition the implementation of the countermeasure has been assumed. Further, when the countermeasure implementation assumption unit 103 makes the assumption after specifying the content of the countermeasure in each cycle, it may also output the specified content of countermeasure.

Although an example of operations performed by the analysis apparatus 10 has been described above, the operations of the analysis apparatus 10 are not limited to the operations shown in the drawing. For example, roll-back may be performed in the processing cycle. Specifically, for example, in a given cycle, when the attack graph generated in the step S101 satisfies a predetermined condition, the process may return to a cycle earlier than the given cycle, and the countermeasure implementation assumption unit 103 may change the target (the attack condition) for which the implementation of a countermeasure is assumed. That is, the countermeasure implementation assumption unit 103 may go back the cycle and redo the assumption of the implementation of the countermeasure. For example, when the number of nodes in the attack graph generated in the step S101 is greater than a predetermined threshold, the process may return to an earlier cycle and the countermeasure implementation assumption unit 103 may change the target for which the implementation of a countermeasure is assumed. Further, when there is an attack condition that is common to the attack path that appears in the attack graph in a cycle that is N cycles earlier than the current cycle and the attack path that appears in the current cycle, the countermeasure implementation assumption unit 103 may redo the process so that the attack condition is regarded as a target to be invalidated in the cycle that is N cycles earlier than the current cycle. Note that N is a positive integer. Further, when all the attack paths that can be eliminated by the assumption of the implementation of a countermeasure for a target (an attack condition) X in a past cycle can also be eliminated by the assumption of the implementation of a countermeasure for a target (an attack condition) Y in a later cycle, processes shown below may be performed. That is, in this case, the countermeasure implementation assumption unit 103 may cancel the assumption of the implementation of the countermeasure for the target X. For example, assume that attack paths P1 and P2 in an attack graph G1 in the first cycle can be eliminated by the assumption of the implementation of the countermeasure for the target X in the first cycle. Further, assume that an attack path P3 in an attack graph G2 in the second cycle and the attack paths P1 and P2 in the attack graph G1 in the first cycle can be eliminated by the assumption of the countermeasure for the target Y in the second cycle. In such a case, the countermeasure implementation assumption unit 103 may cancel the assumption of the implementation of the countermeasure for the target X in the first cycle and make the assumption of the implementation of the countermeasure for the target Y in the second cycle. By doing so, it is possible to select an attack condition by which the attack path can be efficiently eliminated as the target to be eliminated. Note that when going back of a cycle(s) occurs, the analysis apparatus 10 redoes the cyclic processes again from the cycle to which the process has gone back.

Figure 6A:
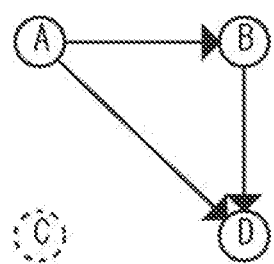
FIG. 6A is a schematic diagram showing entities to be analyzed in a first cycle.
Figure 6B:
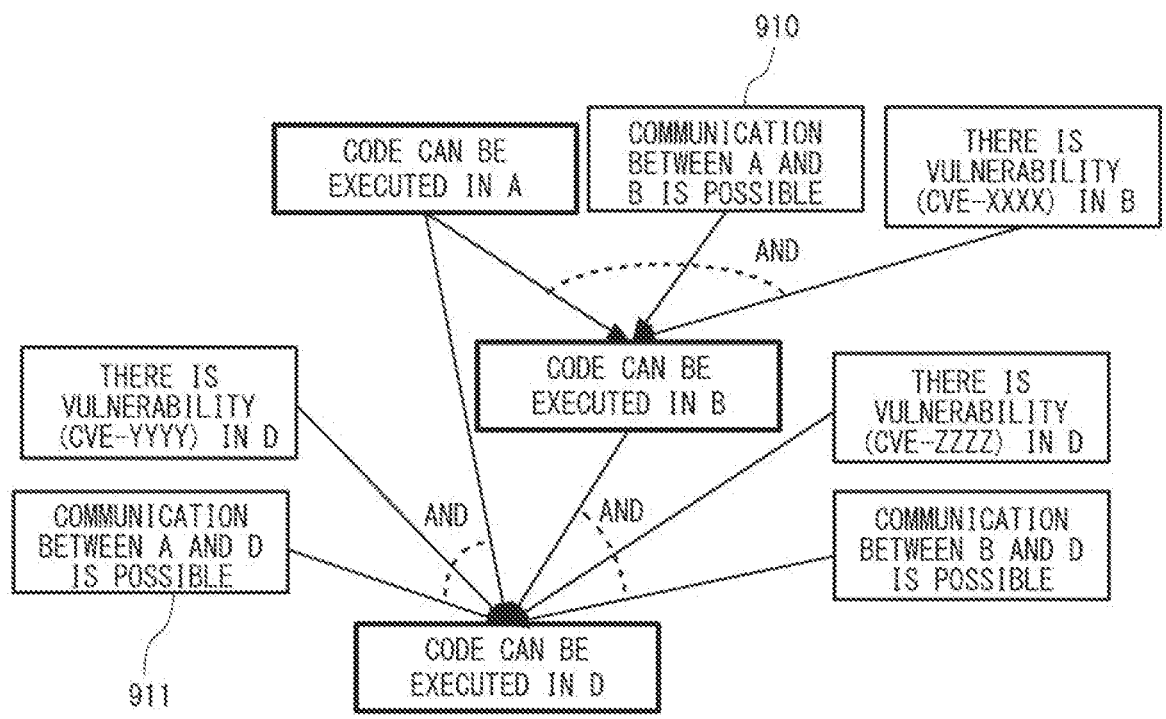
FIG. 6B is a schematic diagram showing an attack graph generated in the first cycle.

Next, the operations performed by the analysis apparatus 10 will be explained by using a specific example. In the description below, it is assumed that the information processing system to be analyzed includes four host computers, i.e., hosts A, B, C and D. Further, it is assumed that the host A is a host computer that becomes the starting point of an attack, and the host D is a host computer that becomes the final target of the attack. In this case, in the first cycle, as shown in FIG. 6a, the analysis target selection unit 101 selects, for example, the hosts A, B and D as analysis targets. In the first cycle, the attack graph generation unit 102 generates, for example, an attack graph for these analysis targets as shown in FIG. 6B. In this attack graph, there are two attack paths described below (note that these attack paths are indicated by arrows in FIG. 6A)

A direct attack path from the host A to the host D.

An attack path from the host A to the host D through the host B.

Figure 6C:
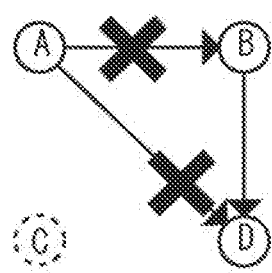
FIG. 6C is a schematic diagram showing attack paths eliminated by a process of a countermeasure implementation assumption unit in the first cycle.

For these attack paths, in the first cycle, the countermeasure implementation assumption unit 103 assumes, for example, the implementation of a countermeasure(s) for invalidating attack conditions so as to eliminate these two attack paths. For example, in regard to an attack condition node 910 indicating an attack condition that communication between the hosts A and B is possible, the countermeasure implementation assumption unit 103 assumes that a countermeasure in which a firewall for blocking communication between these hosts is installed is implemented. Similarly, in regard to an attack condition node 911 indicating an attack condition that communication between the hosts A and D is possible, the countermeasure implementation assumption unit 103 assumes that a countermeasure in which a firewall for blocking communication between these hosts is installed is implemented. By the assumption of the implementation of these countermeasures, the above-described two attack paths are eliminated as shown in FIG. 6C. Note that, in FIG. 6C, each of the eliminations of the attack paths is indicated by a symbol X.

Figure 6D:
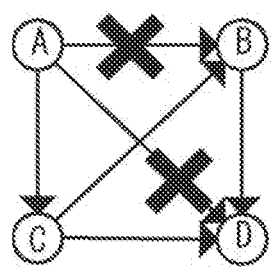
FIG. 6D is a schematic diagram showing entities to be analyzed in a second cycle.
Figure 6E:
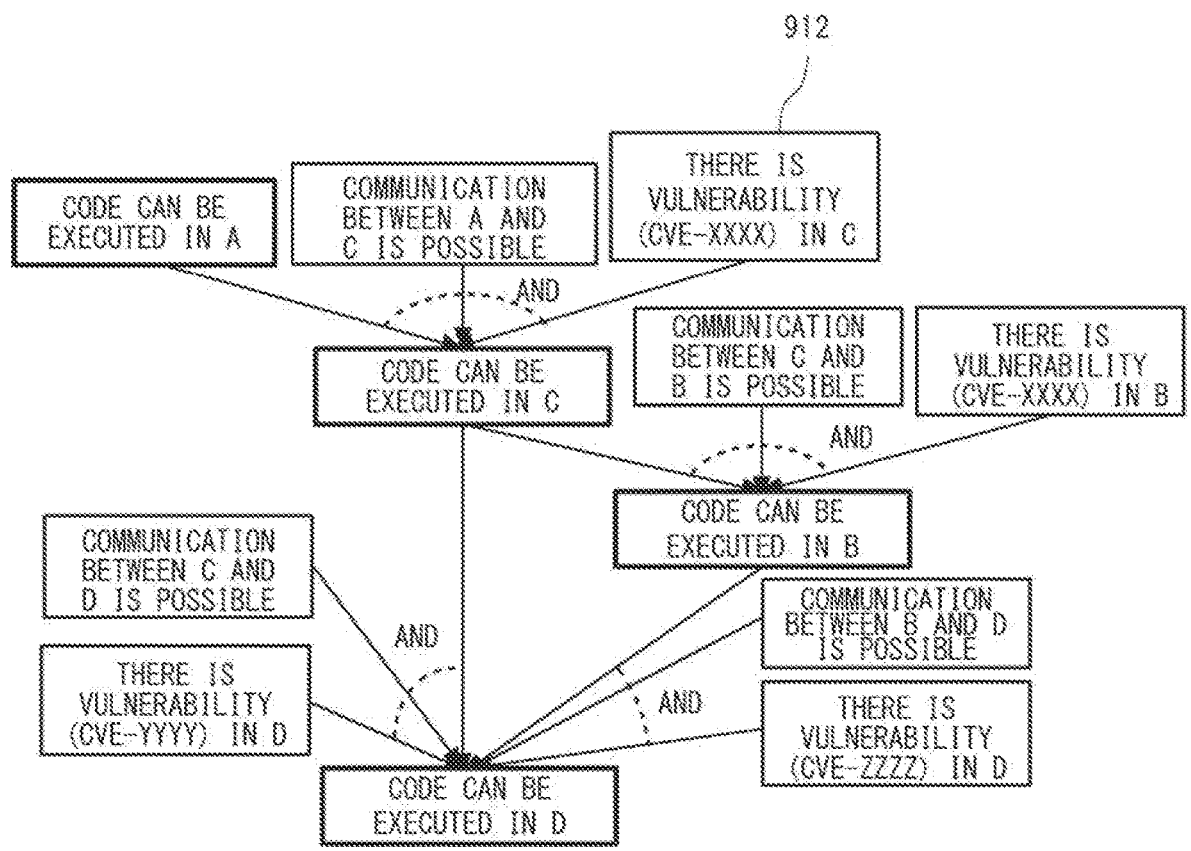
FIG. 6E is a schematic diagram showing an attack graph generated in the second cycle.

Next, in the second cycle, the analysis target selection unit 101 newly selects the host C as an analysis target as shown in FIG. 6D. In the second cycle, the attack graph generation unit 102 generates an attack graph for a set of analysis targets selected by the analysis target selection unit 101 in the first and second cycles. However, when doing so, the attack graph generation unit 102 generates the attack graph on the assumption that the attack conditions for which the implementation of the countermeasures has been assumed by the countermeasure implementation assumption unit 103 in the first cycle do not hold. That is, the attack graph generation unit 102 generates an attack graph in which the above-described two attack paths are excluded. Specifically, the attack graph generation unit 102 generates, for example, an attack graph shown in FIG. 6E. In this attack graph, there are two attack paths described below (note that these attack paths are indicated by arrows in which no symbol X is added in FIG. 6D)

An attack path from the host A to the host D through the host C.

An attack path from the host A to the host D through the hosts C and B in this order.

Figure 6F:
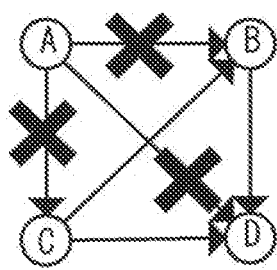
FIG. 6F is a schematic diagram showing attack paths eliminated by a process of the countermeasure implementation assumption unit in the second cycle.

For these attack paths, in the second cycle, the countermeasure implementation assumption unit 103 assumes, for example, the implementation of a countermeasure(s) for invalidating the attack conditions so as to eliminate these two attack paths. For example, in regard to an attack condition node 912 indicating an attack condition that there is a vulnerability in the host C, the countermeasure implementation assumption unit 103 assumes that a countermeasure in which software of the host C is updated is implemented. By the assumption of the implementation of this countermeasure, the above-described two attack paths are eliminated as shown in FIG. 6F.

In this example, since all the host computers are analyzed in two cycles, the analysis process of the analysis apparatus 10 is finished after the processes in the two cycles are performed. As described above, there are only two attack paths in each cycle, so that it prevents the size of the attack graph from becoming enormously large.

The first example embodiment has been described above. In the analysis apparatus 10, not all the elements of the information processing system are included in the analysis targets from the beginning, but the analysis targets are gradually increased over a plurality of cycles. When doing so, the implementation of a countermeasure(s) for invalidating an attack condition(s) is assumed in each cycle. Therefore, in an attack graph in which this assumption is made, an attack path(s) related to this assumption is eliminated, so that the size of the attack graph is reduced. Therefore, it is possible to add elements to be analyzed while preventing the size of the attack graph, i.e., the number of attack paths, from explosively increasing, and thereby to eventually cope with all the elements as the analysis targets. Therefore, it is possible to appropriately perform the analysis of attack paths and countermeasures for preventing (i.e., eliminating) these attack paths in the information processing system.

Second Example Embodiment

If the number of computers to be analyzed in each cycle is too small, it may lead to inefficient application of countermeasures. For example, in an attack graph, it may be possible, by blocking the establishment of a higher-level attack condition node, to eliminate all the various attack paths that go through lower-level attack condition nodes connected to that higher-level attack condition node. However, in a given cycle, if this higher-level attack condition node has not yet appeared in the attack graph, such efficient blocking cannot be discovered. Therefore, it is necessary to assume an implementation of countermeasure for each of various attack paths that go through a lower attack condition node(s). That is, when the number of computers to be analyzed is too small in the first cycle, it may be impossible to obtain information as to how to apply an efficient countermeasure. Therefore, in this example embodiment, the analysis apparatus 10 performs optimization of analysis targets in the first cycle.

Specifically, in this example embodiment, the analysis apparatus 10 performs a preliminary process described below before carrying out the above-described cyclic processes in order to determine computers that are selected as the analysis targets in the first cycle. Firstly, the analysis target selection unit 101 temporarily selects all the computers to be analyzed. That is, the analysis target selection unit 101 selects a set composed of all the computers constituting the information processing system. Then, the analysis target selection unit 101 repeats a reduction or a modification (e.g., replacement) of the set of computers for the set of all the computers until a set with which the process of the attack graph generation unit 102 can be completed within a predetermined time is obtained. Note that, in the preliminary process, a process(es) is performed in a trial manner to determine whether or not the process by the attack graph generation unit 102 will be completed within the predetermined time. When the process is not completed within the predetermined time, the analysis target selection unit 101 reduces or modifies the current set. Note that, for example, the analysis target selection unit 101 randomly performs a reduction and a modification to find out which elements should be excluded to reduce the set, and which elements in the set should be replaced by other elements. Note that it may also be checked whether the process of the countermeasure implementation assumption unit 103 will be completed within a predetermined time. Then, the analysis target selection unit 101 selects the set, which has been obtained by repeatedly reducing or modifying the set, as the analysis targets in the first cycle.

By preforming the above-described preliminary process, it is possible to obtain an attack graph including the maximum number of analysis targets under the precondition that the process can be completed within a desired calculation time. Therefore, the countermeasure implementation assumption unit 103 can assume the efficient implementation of countermeasures in the above-described cyclic processes.

Figure 7:
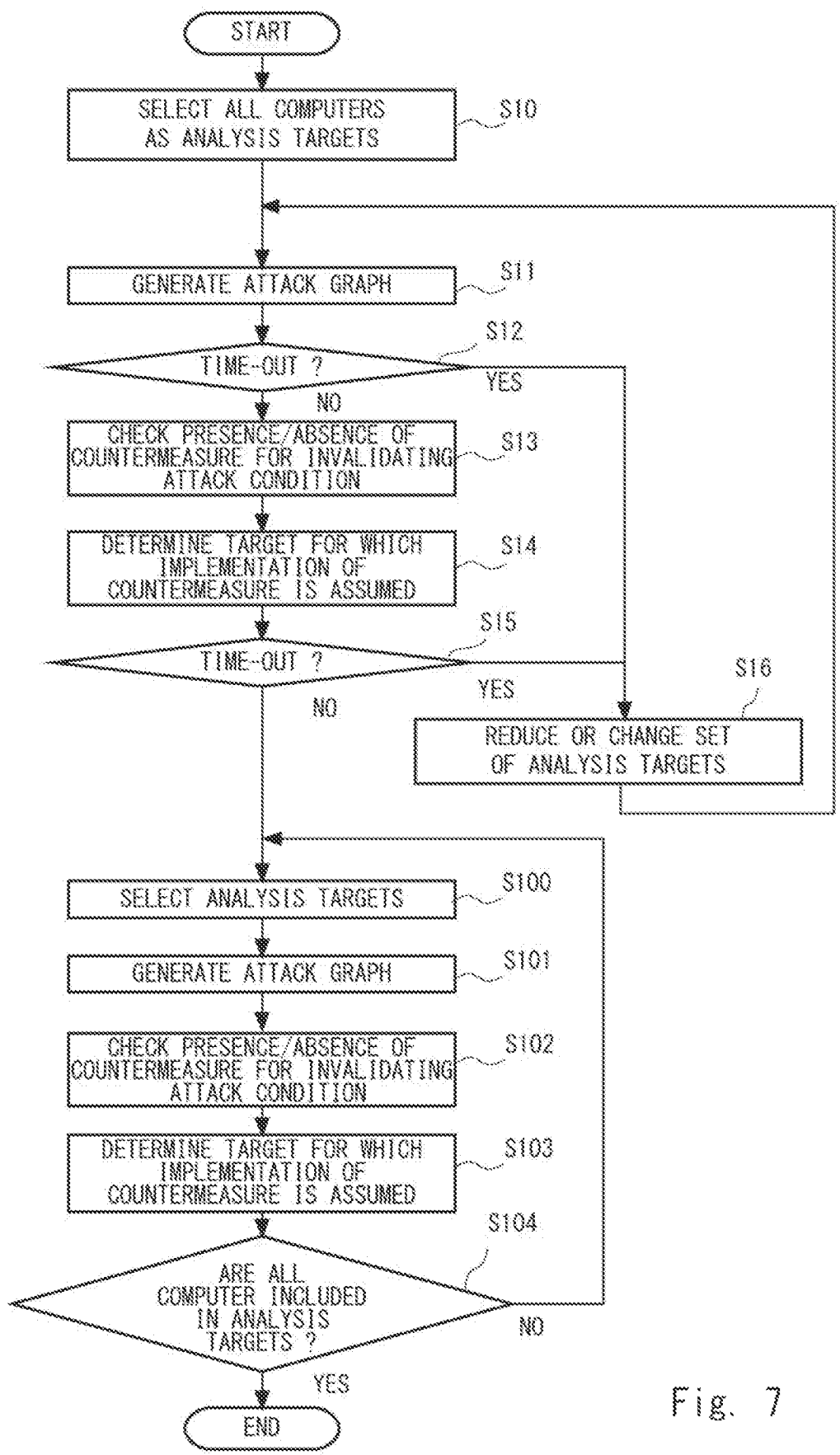
FIG. 7 is a flowchart showing an example of operations performed by an analysis apparatus according to a second example embodiment.

FIG. 7 is a flowchart showing an example of operations performed by the analysis apparatus 10 according to the second example embodiment. The flowchart shown in FIG. 7 differs from the flowchart shown in FIG. 5 because processes in steps S10 to S16 are performed as preliminary processes before the cyclic processes in the steps S100 to S104. A flow of operations performed by the analysis apparatus 10 according to the second example embodiment will be described hereinafter along the flowchart shown in FIG. 7.

Firstly, in the step S10, the analysis target selection unit 101 selects all the computers of the information processing system as analysis targets. That is, the analysis target selection unit 101 regards a set containing all the computers as its elements as a set of analysis targets.

Next, in the step S11, the attack graph generation unit 102 performs a process for generating an attack graph for the set of analysis targets currently set by the analysis target selection unit 101.

Next, in the step S12, it is determined whether or not the process of the attack graph generation unit 102 has been completed within a predetermined time. When the process has not yet been completed after the predetermined time has elapsed, the attack graph generation unit 102 times out the process. When no time-out has occurred, i.e., the process of the attack graph generation unit 102 has been completed within the predetermined time, the process moves to the step S13. On the other hand, when a time-out has occurred, i.e., the process of the attack graph generation unit 102 has not finished within the predetermined time, the process moves to the step S16.

In the step S13, the countermeasure implementation assumption unit 103 checks whether or not there is countermeasure(s) for invalidating an attack condition(s) for an attack path(s) present in the attack graph generated in the step S11.

Next, in the step S14, the countermeasure implementation assumption unit 103 determines which of the attack conditions for which there are countermeasures for invalidation should be coped with (i.e., selected) as the target (i.e., the attack condition) for which the implementation of the countermeasure will be assumed. Note that when there are a plurality of countermeasures for an attack condition, the countermeasure implementation assumption unit 103 may specify which of the countermeasures is assumed to be implemented.

Next, in the step S15, it is determined whether or not the process of the countermeasure implementation assumption unit 103 has been completed within a predetermined time. When the process has not yet been completed after the predetermined time has elapsed, the countermeasure implementation assumption unit 103 times out the process. When no time-out has occurred, i.e., the process of the countermeasure implementation assumption unit 103 has been completed within the predetermined time, the process moves to a step S100. The set that is set at this stage is a set containing the maximum number of analysis targets under the precondition that the process can be completed in a desired calculation time. On the other hand, when a time-out has occurred, i.e., the process of the countermeasure implementation assumption unit 103 has not finished within the predetermined time, the process moves to the step S16.

In the step S16, the analysis target selection unit 101 reduces or modifies the set of analysis targets that is currently set. Note that when the set of analysis targets that is currently set is the set that was set in the step S10, this set is the set containing all the computers as its elements, so that the set is reduced in this step. After the step S16, the process returns to the step S11. Therefore, the process for generating an attack graph is performed for the set that has been newly set in the step S16.

After the above-described preliminary process, the process proceeds to the step S100, and the selecting process of the analysis target selection unit 101 in the first cycle is performed in the step S100. The targets selected at this stage are the elements of the set that is currently set. After that, a series of cycles is repeated in a manner similar to the flowchart shown in FIG. 5. Note that, in the flowchart shown in FIG. 7, it is determined whether each of the process of the attack graph generation unit 102 and that of the countermeasure implementation assumption unit 103 will be completed within a predetermined time. However, the determination as to whether the process will be completed within a predetermined time may be performed only for the process of the attack graph generation unit 102.

Third Example Embodiment

Although the processes are performed by one analysis apparatus 10 in the above-described example embodiments, the processes may be performed by a plurality of analysis apparatuses 10 in a distributed manner. That is, an analysis system including a plurality of analysis apparatuses 10 may be constructed. In this case, each of the analysis apparatuses 10 takes charge of part of the process for generating an attack graph and the process for assuming the implementation of a countermeasure(s) for a group of computers constituting the information processing system to be analyzed. Therefore, the analysis target selection unit 101 of each of the analysis apparatuses 10 selects computers from a respective one of subsets which belong to the set composed of all the computers to be analyzed and are different from each other. That is, for example, when the analysis system is composed of a first analysis apparatus 10 and a second analysis apparatus 10, the analysis target selection unit 101 of the first analysis apparatus 10 selects analysis targets from a first subset. Similarly, the analysis target selection unit 101 of the second analysis apparatus 10 selects analysis targets from a second subset.

Further, one of the analysis apparatuses 10 merges the processing results of all of the analysis apparatuses 10, and lastly performs an analysis for the set of all the computers to be analyzed. That is, one of the analysis apparatuses 10 summarizes (i.e., collects) the processing results of the countermeasure implementation assumption units 103 of all of the analysis apparatuses 10, and generates an attack graph for the set of all the computers to be analyzed based on the summarized (i.e., collected) processing results.

For example, assume that an information processing system to be analyzed is composed of five host computers, i.e., hosts A, B, C, D and E. Further, it is assumed that the host A is a host computer that becomes the starting point of an attack, and the host E is a host computer that becomes the final target of the attack. In this case, each of the analysis apparatuses 10 performs an analysis while regarding the host A as the starting point of the attack and regarding the host E as the final target of the attack. That is, the host computer that becomes the starting point of the attack and the host computer that becomes the final target of the attack are set in common for all the analysis apparatuses 10. Further, when the analysis system is composed of a first analysis apparatus 10 and a second analysis apparatus 10, the analysis target selection unit 101 of each of the analysis apparatuses 10 selects hosts, for example, as described below. The analysis target selection unit 101 of the first analysis apparatus 10 selects, for example, analysis targets from a subset composed of the hosts A, B and E. Further, the analysis target selection unit 101 of the second analysis apparatus 10 selects, for example, analysis targets from a subset composed of the hosts A, C, D and E. After the above-described cyclic processes are performed in each of the analysis apparatuses 10, for example, the second analysis apparatus 10 transmits its processing result to the first analysis apparatus 10, so that the processing results are summarized (i.e., collected) in the first analysis apparatus 10. Specifically, information as to for which attack conditions countermeasures have been assumed in the countermeasure implementation assumption unit 103 is summarized. After that, the first analysis apparatus 10 performs the above-described cycle for a set composed of the hosts A, B, C, D and E. However, when doing so, the attack graph generation unit 102 creates an attack graph in which attack paths that have been invalidated by the assumption of the implementation of countermeasures indicated in the summarized processing result are excluded.

Figure 8:
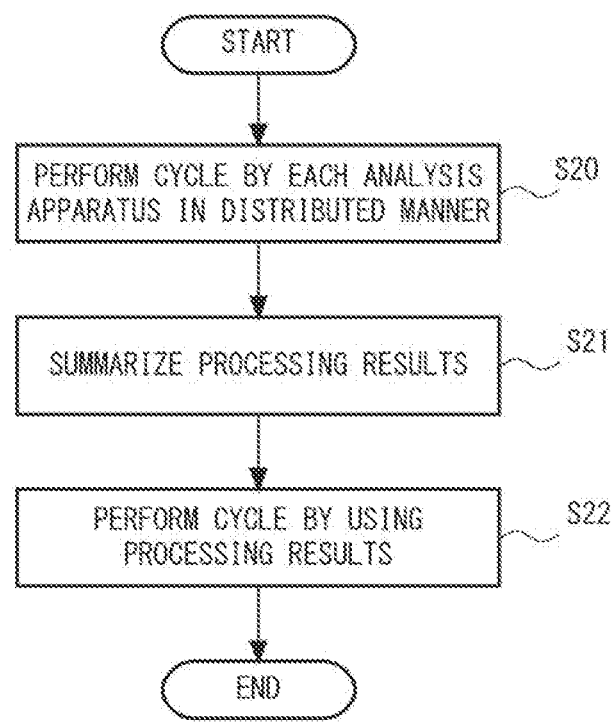
FIG. 8 is a flowchart showing an example of operations performed by an analysis system according to a third example embodiment.

FIG. 8 is a flowchart showing an example of operations performed by an analysis system according to a third example embodiment. As described above, firstly, in a step S20, the above-described cycle is performed by each of the analysis apparatuses 10 in a distributed manner. Next, in a step S21, the processing results are summarized (i.e., collected) in one of the analysis apparatuses 10. Next, in a step S22, the analysis apparatus 10 that has acquired the processing results performs the cycle by using the processing results.

According to this example embodiment, since the processes are performed in a distributed manner, the load on each of the analysis apparatuses 10 can be reduced. Note that this example embodiment can be applied not only to the analysis apparatus 10 according to the first example embodiment but also to the analysis apparatus 10 according to the second example embodiment.

Note that although each of the above-described example embodiments has been described on the assumption that the targets selected by the analysis target selection unit 101 are computers constituting the information processing system, the selected targets may be any elements (hereinafter referred to as entities) constituting an information processing system. For example, the entity may be each of computers (e.g., host computers) constituting an information processing system, each of software programs installed in computers, or a type of a user account present in the system. That is, analysis targets that are increased in each cycle do not have to be computers, but can be any entities such as software programs or accounts.

Further, even in an example embodiment described below, it is possible to analyze the security of an information processing system to be analyzed irrespective of the scale of the system or the state of connections among the computers constituting the system.

Figure 9:
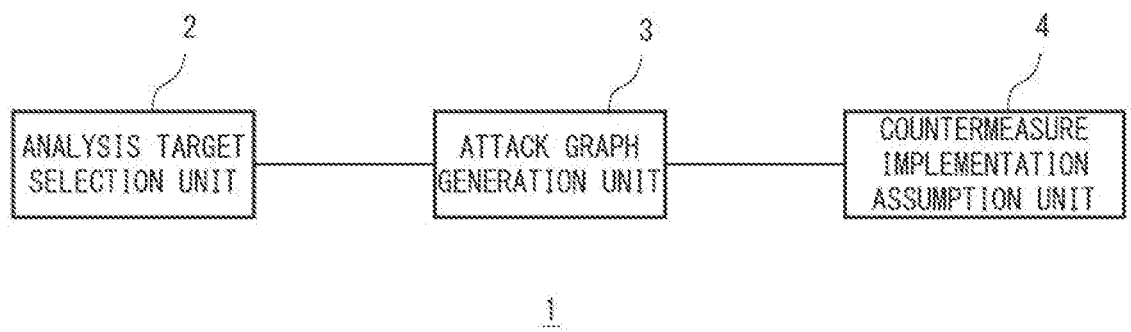
FIG. 9 is a block diagram showing an example of a configuration of an analysis apparatus according to another example embodiment.

FIG. 9 is a block diagram showing an example of a configuration of an analysis apparatus 1 according to another example embodiment. The analysis apparatus 1 analyzes the security of an arbitrary information processing system, and includes an analysis target selection unit 2, an attack graph generation unit 3, and a countermeasure implementation assumption unit 4.

The analysis target selection unit 2 selects entities to be analyzed from among entities which are elements of the information processing system. The attack graph generation unit 3 generates an attack graph for a set of the entities selected by the analysis target selection unit 2. The countermeasure implementation assumption unit 4 assumes that a countermeasure(s) for invalidating an attack condition(s) is implemented in the attack graph generated by the attack graph generation unit 3.

The analysis apparatus 1 repeats a series of processes including the process of the analysis target selection unit 2, the process of the attack graph generation unit 3, and the process of the countermeasure implementation assumption unit 4 over a plurality of cycles until all the entities to be analyzed are selected as analysis targets. Note that the attack graph generation unit 3 generates the attack graph on the precondition that the countermeasure(s) for invalidating the attack condition(s) assumed by the countermeasure implementation assumption unit 4 has been implemented. That is, when the implementation of a countermeasure(s) for invalidating an attack condition(s) is assumed by the countermeasure implementation assumption unit 4, the attack graph generation unit 3 generates an attack graph on the precondition that the countermeasure(s) has been implemented. Further, the analysis target selection unit 2 selects at least one of all the entities to be analyzed and adds the selected entity in the analysis targets in each of a plurality of cycles.

More specifically, in the first cycle of the plurality of cycles, the analysis target selection unit 2 selects some of all the entities to be analyzed. Then, in the subsequent cycles, the analysis target selection unit 2 gradually adds the remaining entities in the analysis targets until all the entities to be analyzed are selected as analysis targets.

That is, the analysis apparatus 1 does not cope with all the entities of the information processing system as the analysis targets from the beginning, but gradually increases the analysis targets over a plurality of cycles. When doing so, the implementation of a countermeasure(s) for invalidating an attack condition(s) is assumed in each cycle. Therefore, in an attack graph in which this assumption is made, an attack path(s) related to this assumption is eliminated, so that the size of the attack graph is reduced. Therefore, it is possible to add entities to be analyzed while preventing the size of the attack graph, i.e., the number of attack paths, from explosively increasing, and thereby to eventually cope with all the entities as the analysis targets. Therefore, it is possible to appropriately perform the analysis of attack paths and countermeasures for preventing (i.e., eliminating) these attack paths in the information processing system.

Although the present invention has been described above with reference to example embodiments, the present invention is not limited to the above-described example embodiments. Various modifications that can be understood by those skilled in the art can be made to the configuration and details of the present invention within the scope of the invention.

The whole or part of the example embodiments disclosed above can be described as, but not limited to, the following supplementary notes.

(Supplementary Note 1)

An analysis apparatus comprising:
  an analysis target selection unit configured to select entities to be analyzed from among entities which are elements of an information processing system;
  an attack graph generation unit configured to generate an attack graph for a set of the selected entities; and
  a countermeasure implementation assumption unit configured to assume that a countermeasure for invalidating an attack condition is implemented in the generated attack graph, wherein
  a series of processes including a process of the analysis target selection unit, a process of the attack graph generation unit, and a process of the countermeasure implementation assumption unit is repeated over a plurality of cycles until all entities to be analyzed are selected as analysis targets,
  the attack graph generation unit generates the attack graph on a precondition that the countermeasure for invalidating the attack condition assumed by the countermeasure implementation assumption unit has been implemented, and
  the analysis target selection unit selects at least one of all the entities to be analyzed and adds the selected entity in the analysis targets in each of the plurality of cycles.

(Supplementary Note 2)

The analysis apparatus described in Supplementary note 1, wherein the countermeasure implementation assumption unit assumes that a countermeasure for invalidating an attack condition for at least one of a plurality of attack paths indicated in the attack graph is implemented.

(Supplementary Note 3)

The analysis apparatus described in Supplementary note 2, wherein the countermeasure implementation assumption unit determines the at least one of the plurality of attack paths indicated in the attack graph based on a level of danger of the attack path determined by a predetermined index.

(Supplementary Note 4)

The analysis apparatus described in Supplementary note 3, wherein the predetermined index is a score in a CVSS (Common Vulnerability Scoring System).

(Supplementary Note 5)

The analysis apparatus described in any one of Supplementary notes 1 to 4, wherein when the attack graph generated by the attack graph generation unit satisfies a predetermined condition, the process returns to a preceding cycle and the countermeasure implementation assumption unit changes a target for which implementation of a countermeasure is assumed.

(Supplementary Note 6)

The analysis apparatus described in any one of Supplementary notes 1 to 5, wherein before the plurality of cycles are performed, the analysis target selection unit temporarily selects all entities to be analyzed, and repeats a reduction or a modification of a set of entities for the set composed of all the entities until a set with which the process of the attack graph generation unit can be completed within a predetermined time is obtained.

(Supplementary Note 7)

The analysis apparatus described in any one of Supplementary notes 1 to 6, wherein the analysis target selection unit selects an entity according to an instruction from a user.

(Supplementary Note 8)

An analysis system comprising a plurality of analysis apparatuses, wherein
  each of the analysis apparatuses comprises:
    an analysis target selection unit configured to select entities to be analyzed from among entities which are elements of an information processing system;
    an attack graph generation unit configured to generate an attack graph for a set of the selected entities; and
    a countermeasure implementation assumption unit configured to assume that a countermeasure for invalidating an attack condition is implemented in the generated attack graph,
  in each of the analysis apparatuses, a series of processes including a process of the analysis target selection unit, a process of the attack graph generation unit, and a process of the countermeasure implementation assumption unit is repeated over a plurality of cycles until all entities to be analyzed are selected as analysis targets,
  the attack graph generation unit generates the attack graph on a precondition that the countermeasure for invalidating the attack condition assumed by the countermeasure implementation assumption unit has been implemented,
  the analysis target selection unit selects at least one of all the entities to be analyzed and adds the selected entity in the analysis targets in each of the plurality of cycles,
  the analysis target selection unit of each of the analysis apparatuses selects entities from subsets different from each other, the subsets belonging to a set composed of all the entities to be analyzed, and
  one of the analysis apparatuses summarizes processing results of the countermeasure implementation assumption units of all the analysis apparatuses, and generates an attack graph for the set of all the entities to be analyzed based on the processing results.

(Supplementary Note 9)

The analysis system described in Supplementary note 8, wherein before the plurality of cycles are performed, the analysis target selection unit temporarily selects all entities to be analyzed, and repeats a reduction or a modification of a set of entities for the set composed of all the entities until a set with which the process of the attack graph generation unit can be completed within a predetermined time is obtained.

(Supplementary Note 10)

An analysis method comprising:
performing a process for selecting entities to be analyzed among entities which are elements of an information processing system;
performing a process for generating an attack graph for a set of the selected entities; and
performing a process for assuming implementation of a countermeasure for invalidating an attack condition in the generated attack graph, wherein
a series of processes including the process for selecting entities to be analyzed, the process for generating an attack graph, and the process for assuming implementation of a countermeasure is repeated over a plurality of cycles until all entities to be analyzed are selected as analysis targets,
in the process for generating an attack graph, the attack graph is generated on a precondition that the countermeasure for invalidating the attack condition assumed in the process for assuming implementation of a countermeasure has been implemented, and
in the process for selecting entities to be analyzed, at least one of all the entities to be analyzed is selected and added in the analysis targets in each of the plurality of cycles.

(Supplementary Note 11)

A non-transitory computer readable medium storing a program for causing a computer to perform:
an analysis target selection step of selecting entities to be analyzed among entities which are elements of an information processing system;
an attack graph generation step of generating an attack graph for a set of the selected entities; and
a countermeasure implementation assumption step of assuming implementation of a countermeasure for invalidating an attack condition in the generated attack graph, wherein
a series of processes including a process of the analysis target selection step, a process of the attack graph generation step, and a process of the countermeasure implementation assumption step is repeated over a plurality of cycles until all entities to be analyzed are selected as analysis targets,
in the attack graph generation step, the attack graph is generated on a precondition that the countermeasure for invalidating the attack condition assumed in the countermeasure implementation assumption step has been implemented, and
in the analysis target selection step, at least one of all the entities to be analyzed is selected and added in the analysis targets in each of the plurality of cycles.

REFERENCE SIGNS LIST

1 ANALYSIS APPARATUS
2 ANALYSIS TARGET SELECTION UNIT
3 ATTACK GRAPH GENERATION UNIT
4 COUNTERMEASURE IMPLEMENTATION ASSUMPTION UNIT
10 ANALYSIS APPARATUS
101 ANALYSIS TARGET SELECTION UNIT
102 ATTACK GRAPH GENERATION UNIT
103 COUNTERMEASURE IMPLEMENTATION ASSUMPTION UNIT
104 ENVIRONMENTAL INFORMATION STORAGE UNIT
105 ATTACK INFORMATION STORAGE UNIT
106 COUNTERMEASURE INFORMATION STORAGE UNIT
150 NETWORK INTERFACE
151 MEMORY
152 PROCESSOR

What is claimed is:

1. An analysis apparatus comprising:
hardware, including a processor and memory;
an analysis target selection unit implemented at least by the hardware and configured to select entities to be analyzed from among entities which are elements of an information processing system;
an attack graph generation unit implemented at least by the hardware and configured to generate an attack graph for a set of the selected entities; and
a countermeasure implementation assumption unit implemented at least by the hardware and configured to assume that a countermeasure for invalidating an attack condition is implemented in the generated attack graph, wherein
a series of processes including a process of the analysis target selection unit, a process of the attack graph generation unit, and a process of the countermeasure implementation assumption unit is repeated over a plurality of cycles until all the entities of the information processing system to be analyzed have been selected as analysis targets,
the attack graph generation unit generates the attack graph on a precondition that the countermeasure for invalidating the attack condition assumed by the countermeasure implementation assumption unit has been implemented, and
the analysis target selection unit selects at least an entity that becomes a starting point of an attack and an entity that becomes a final target of the attack in a first cycle of the plurality of cycles and gradually adds remaining entities to the analysis targets in subsequent cycles until all the entities to be analyzed have been selected as the analysis targets.

2. The analysis apparatus according to claim 1, wherein the countermeasure implementation assumption unit assumes that the countermeasure for invalidating the attack condition for at least one of a plurality of attack paths indicated in the attack graph is implemented.

3. The analysis apparatus according to claim 2, wherein the countermeasure implementation assumption unit determines the at least one of the plurality of attack paths indicated in the attack graph based on a level of danger of each attack path determined by a predetermined index.

4. The analysis apparatus according to claim 3, wherein the predetermined index is a score in a CVSS (Common Vulnerability Scoring System).

5. The analysis apparatus according to claim 1, wherein when the attack graph generated by the attack graph generation unit satisfies the predetermined condition, a current cycle returns to a preceding cycle and the countermeasure implementation assumption unit changes a target for which implementation of the countermeasure is assumed.

6. The analysis apparatus according to claim 1, wherein before the plurality of cycles are performed, the analysis target selection unit temporarily selects all the entities to be analyzed, and repeats a reduction or a modification of a set composed of all the entities until a set with which the process of the attack graph generation unit can be completed within a predetermined time is obtained.

7. The analysis apparatus according to claim 1, wherein the analysis target selection unit selects the entities according to an instruction from a user.

8. An analysis system comprising a plurality of analysis apparatuses, wherein
each of the analysis apparatuses comprises:
hardware, including a processor and memory;
an analysis target selection unit implemented at least by the hardware and configured to select entities to be analyzed from among entities which are elements of an information processing system;
an attack graph generation unit implemented at least by the hardware and configured to generate an attack graph for a set of the selected entities; and
a countermeasure implementation assumption unit implemented at least by the hardware and configured to assume that a countermeasure for invalidating an attack condition is implemented in the generated attack graph,
in each of the analysis apparatuses, a series of processes including a process of the analysis target selection unit, a process of the attack graph generation unit, and a process of the countermeasure implementation assumption unit is repeated over a plurality of cycles until all the entities of the information processing system to be analyzed have been selected as analysis targets,
the attack graph generation unit generates the attack graph on a precondition that the countermeasure for invalidating the attack condition assumed by the countermeasure implementation assumption unit has been implemented,
the analysis target selection unit selects at least an entity that becomes a starting point of an attack and an entity that becomes a final target of the attack in a first cycle of the plurality of cycles and gradually adds remaining entities to the analysis targets in subsequent cycles until all the entities to be analyzed have been selected as the analysis targets,
the analysis target selection unit of each of the analysis apparatuses selects subsets of entities different from each other, the subsets belonging to a set composed of all the entities to be analyzed, and
one of the analysis apparatuses summarizes processing results of the countermeasure implementation assumption units of all the analysis apparatuses, and generates an attack graph for the set of all the entities to be analyzed based on the processing results.

9. The analysis system according to claim 8, wherein before the plurality of cycles are performed, the analysis target selection unit temporarily selects all the entities to be analyzed, and repeats a reduction or a modification of a set composed of all the entities until a set with which the process of the attack graph generation unit can be completed within a predetermined time is obtained.

10. An analysis method comprising:
performing a process for selecting entities to be analyzed among entities which are elements of an information processing system;
performing a process for generating an attack graph for a set of the selected entities; and
performing a process for assuming implementation of a countermeasure for invalidating an attack condition in the generated attack graph, wherein
a series of processes including the process for selecting entities to be analyzed, the process for generating an attack graph, and the process for assuming implementation of a countermeasure is repeated over a plurality of cycles until all the entities of the information processing system to be analyzed have been selected as analysis targets,
in the process for generating an attack graph, the attack graph is generated on a precondition that the countermeasure for invalidating the attack condition assumed in the process for assuming implementation of a countermeasure has been implemented, and
in the process for selecting entities to be analyzed, at least an entity that becomes a starting point of an attack and an entity that becomes a final target of the attack are selected in a first cycle of the plurality of cycles, and remaining entities are gradually added to the analysis targets in subsequent cycles until all the entities to be analyzed are selected as the analysis targets.

11. A non-transitory computer readable medium storing a program for causing a computer to perform:
an analysis target selection step of selecting entities to be analyzed among entities which are elements of an information processing system;
an attack graph generation step of generating an attack graph for a set of the selected entities; and
a countermeasure implementation assumption step of assuming implementation of a countermeasure for invalidating an attack condition in the generated attack graph, wherein
a series of processes including a process of the analysis target selection step, a process of the attack graph generation step, and a process of the countermeasure implementation assumption step is repeated over a plurality of cycles until all the entities of the information processing system to be analyzed have been selected as analysis targets,
in the attack graph generation step, the attack graph is generated on a precondition that the countermeasure for invalidating the attack condition assumed in the countermeasure implementation assumption step has been implemented, and
in the analysis target selection step, at least an entity that becomes a starting point of an attack and an entity that becomes a final target of the attack are selected in a first cycle of the plurality of cycles, and remaining entities are gradually added to the analysis targets in subsequent cycles until all the entities to be analyzed are selected as the analysis targets.

* * * * *